United States Patent
Martikainen et al.

[11] Patent Number: 5,444,700
[45] Date of Patent: Aug. 22, 1995

[54] SWITCHING ELEMENT AND METHOD FOR CONTROLLING THE SAME

[76] Inventors: Olli Martikainen, Kuusmiehentie 34 C 5, SF-00670 Helsinki; Pertti Raatikainen, Koivikkotie 14 A, SF-01620 Vantaa; Marko Suoknuutti, Skinnarilankatu 28 B 8; Juha Zidbeck, Nuijavuori 1 A 5, both of SF-02630 Espoo, all of Finland

[21] Appl. No.: 962,202
[22] PCT Filed: Jun. 19, 1991
[86] PCT No.: PCT/FI91/00192
§ 371 Date: Dec. 17, 1992
§ 102(e) Date: Dec. 17, 1992
[87] PCT Pub. No.: WO91/20143
PCT Pub. Date: Dec. 26, 1991

[30] Foreign Application Priority Data
Jun. 21, 1990 [FI] Finland ................. 903145

[51] Int. Cl.⁶ .............................. H04L 12/54
[52] U.S. Cl. ...................... 370/58.1; 370/58.2; 370/60; 370/61; 370/85.6; 340/825.51; 340/825.79
[58] Field of Search ............ 370/60.1, 61, 58.2, 370/60, 94.1, 58.1, 85.6; 340/825.79, 825.8, 826, 825.5, 825.51

[56] References Cited

U.S. PATENT DOCUMENTS

| | | | |
|---|---|---|---|
| 3,732,543 | 5/1973 | Rocher et al. | 340/172.5 |
| 4,768,190 | 8/1988 | Giancarlo | 370/86 |
| 4,785,446 | 11/1988 | Dias et al. | 370/58 |
| 4,870,639 | 9/1989 | Hayashi et al. | 370/60 |
| 4,890,281 | 12/1989 | Balboni et al. | 370/60 |
| 4,905,224 | 2/1990 | Lobjinski et al. | 370/60 |
| 5,046,064 | 9/1991 | Suzuki et al. | 370/60 |

FOREIGN PATENT DOCUMENTS

| | | | |
|---|---|---|---|
| 88/07295 | 9/1988 | WIPO | H04L 11/16 |

*Primary Examiner*—Douglas W. Olms
*Assistant Examiner*—Russell W. Blum
*Attorney, Agent, or Firm*—Merchant, Gould, Smith, Edell, Welter & Schmidt

[57] ABSTRACT

The invention relates to a switching element and method for controlling the same, for high-speed data traffic. The switching element comprises two input ports (I1, I2) and two output ports (O1, O2), wherethrough data is transmitted in parallel form as data elements; a switching unit (1) for connecting the input and output ports; and a control unit (2), by means of which, on the basis of the address part of each data element, the bus is connected through the switching unit in between the input and output port for sending data elements.

1 Claim, 3 Drawing Sheets

SWITCHING ELEMENT AND METHOD FOR CONTROLLING THE SAME

BACKGROUND OF THE INVENTION

The invention relates to the switching element for high-speed data traffic.

The invention also relates to a method for controlling the said element.

The development of high-speed digital broadband networks and real-time multimedia services based on these networks sets new demands on the hardware and software solutions in these systems. The data transfer rate for instance in a MAN network (Metropolitan Area Network) is 140 Mbps, and in FDDIs (Fiber Distributed Data Interface) 100 Mbps. If packet routing is performed in these environments, there is a demand of 100–600 Mbps throughput of data between data transmission and processing components.

As examples of hardware which demand high data flow rates and thus high data throughput, let us mention high-speed packet switched networks (ATM), routing between FDDI, LAN and MAN networks, real-time digital video compression, real-time multimedia coding (ASN. 1+VER), real-time security algorithms and multiprocessor machines with distributed operating systems (e.g. MACH-supercomputer).

High data throughput demands high data transfer rates between the input and output of the system. In the prior art there are known transputer-type solutions where the processors are connected to each other with 30 Mbps serial connections. However, these connections are difficult to apply, because the fast data stream should be effectively distributed over the transputer network. This would demand some kind of distribution frontend in the system.

SUMMARY OF THE INVENTION

The object of the invention is to introduce a new switching element and method for controlling the same, by means of which element for instance high-speed broadband data networks can be realized, as well as real-time multimedia services based on these networks. A general object of the invention is to provide a versatile switching element to be applied in many different environments, such as in microprocessor bus solutions for connecting processors and memory units or other similar resources, as well as in high-speed digital networks.

The switching element of the invention for high-speed data traffic comprises two input ports and two output ports, through which data is transmitted in data elements, which consist of at least an address part and a data part; a switching unit for connecting the input and output ports; and a control unit whereby the bus is coupled, on the basis of the address part of each data element, through the switching unit, in between the input port and at least one output port for the transmission of data. According to the invention, the input and output ports are ports wherethrough data is transmitted in parallel form; the internal buses of the switching element are parallel buses formed of an address bus and a data bus, these buses being connected to the switching unit at the input ports; the control unit comprises a decoding and coding unit of the address part of the data element, to which unit the input ports are connected by an address part bus; the switching unit is connected to the output ports; and a clock signal channel is arranged in the switching element, the said channel being connected to input buffers, to the control unit and the switching unit; and by means of the clock signal received through this channel, the transmission of data elements, performed through at least the first input port and the first output port, is synchronized.

In a preferred embodiment of the invention, the second input port and the second output port are provided with buffers, most advantageously with FIFO buffers. In that case a peripheral device or the like can be coupled to the second input port and to the second output port asynchronically, although the data elements are transmitted synchronically through the switching element proper.

According to the invention, in the control method of the switching element, data elements are transmitted between input and output ports, so that when the data part of the data element fed in through the first input port carries data, it is sent, through the switching unit, either to the first or second output port or to both, depending on the address of its address part.

According to the invention, the method includes the following steps:

a) when the data part of a data element fed in through the first input port carries data, and it is sent, through the switching unit, to the second output port, the data element fed in through the second input port is sent, through the switching unit, to the first output port, and if the data part of the data element fed in through the second input port is empty, the empty data part or corresponding signal is sent to the first output port;

b) when the data part of the data element fed in through the first input port carries data and it is sent, through the switching unit, only to the first output port, the data element fed in through the second input port is sent, through the switching unit, to the second output port, and if the data part of the data element fed in through the second input port is empty, this empty data part or corresponding signal is sent to the second output port;

c) when the data part of the data element fed in through the first input port carries data and is sent, through the switching element, to both output ports, the supply of data through the second input port is prevented;

d) when the data part of the data element fed in through the first input port is empty, the data element fed in through the second input port is sent, through the switching unit, either to the first or second output port or to both, depending on the address, and if the data part of the data element fed in through the second input port is empty, this empty data part is sent to the first output port; and e) when the data element fed in through the second input port is entering both output ports, this data element can be sent to the first output port of the switching element only in case the first input port sends a data element with an empty data part.

An advantage of the invention is that the switching element is simple in structure, data is transmitted in parallel form, and it has a high throughput rate.

Another advantage of the invention is that the switching element is an all-round element which can be applied for instance in interconnecting high-speed microprocessors, memory circuits and I/O circuits, or it can be used as a component in high-speed switching fields.

Another advantage of the invention is that the switching element can easily be connected to other similar switching elements in order to form different topologies.

Owing to the invention, the switching element can be realized as an integrated circuit, or a large number of switching elements can be integrated in one and the same component. It can also be integrated to form a part of a high-density circuit (VLSI).

BRIEF DESCRIPTION OF THE DRAWINGS

In the following the invention is explained in more detail with reference to the appended drawings, where.

DETAILED DESCRIPTION OF THE PREFERRED EMBODIMENT

Figure 1:
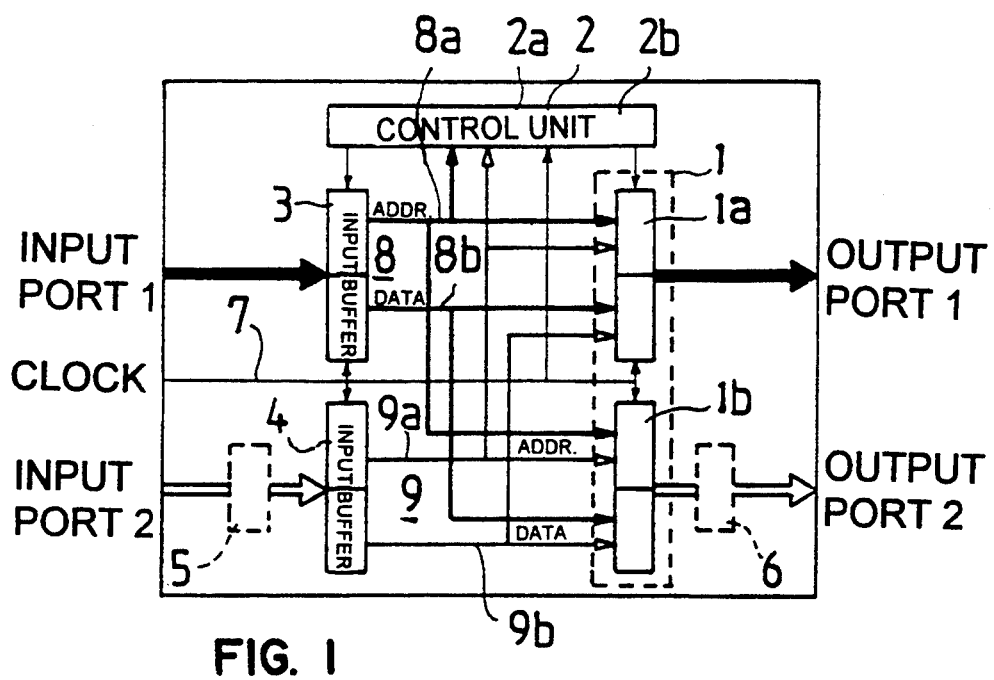
FIG. 1 is a block diagram of a switching element of the invention.

In FIG. 1, the switching element of the invention comprises two input ports I1, I2 and two output ports O1, O2, a high-speed switching unit 1 for interconnecting the input and output ports through internal buses 8, 9, and a control unit 2. The input ports I1, I2 include input buffers 3, 4. The output ports O1, O2 may also be provided with corresponding output buffers (not illustrated in FIG. 1).

Through the input ports I1, I2, the internal buses 8, 9, the switching unit 1 and the output ports O1, O2, data is transferred in parallel form in a data element with a width of N bits, where N=an integral. It may be for instance 8, 16 or 32. The data element is formed of two parts: the address part with A bits, and the data part with D bits. In addition to this, the data element may include additional bits, for instance character check or priority bits. The ratio of the data element width to the widths of the address and data parts is $A+D=\leq N$.

Through the switching element, data elements are transmitted under the control of the control unit 2. The control unit 2 includes an address decoding and coding unit, i.e. the address unit 2a, and the control unit 2b proper. The address unit 2a is connected to the input buffers 3 and 4. The control unit proper 2b is connected to the switching unit 1. Among the internal buses 8, 9 of the switching element, the address part buses 8a, 9a are connected, apart from the swithching unit 1, also to the address unit of the control unit. The data part buses 8b, 9b of the internal buses 8, 9, are connected at the input buffers 3, 4 to the inputs of the switching unit. In the embodiment of FIG. 1, the switching unit 1 is composed of two separate switching units 1a, 1b, the first 1a of which is connected to the first output port O1, and the second 1b to the second output port O2.

Data can be transferred through the switching element of the invention via either of the input ports I1, I2, to both or one of the output ports O1, O2. Data transmission through the switching element is carried out synchronically.

The switching element is provided with a clock signal channel 7, which is connected to both input buffers 3, 4, to the control unit 2 and to the switching unit 1, to its both parts 1a, 1b. By means of this clock signal, the transfer of data elements through the switching element is synchronized.

The second input port I2, and the second output port O2 can be provided with buffers, particularly FIFO buffers 5, 6 (FIFO=First In, First Out). The external connection to the second input port I2 and to the second output port O2 can thus be either synchronous or asynchronous. The first input port I1 and the first output port O1 are in this case reserved for synchronous data transfer. In FIG. 1, the FIFO buffers are represented with dotted lines.

Through the switching element of the invention, data is transferred in parallel form as a data element with a width of N bits. The data element is formed of an address part A and a data part D, as was maintained above. The data part may carry data, or it may be empty. An empty data part is in this case indicated with a NULL address. The data part of the data element is synchronously transferred through the switching element, by utilizing the address part of the data element and the address information carried therein. The address information can be coded in may different ways depending on the chosen topology, i.e. the method with which the group of switching elements is interconnected.

In the switching element of FIG. 1, data, i.e. data elements with N bits, is transferred from either of the input ports to one or several output ports. The input and output ports I1, I2 and O1, O2, are mutually arranged to operate in the following way.

When the data part of the data element fed in through the first input port I1 carries data, it is sent, through the switching unit 1, either to the first O1 or second O2 output port, or to both depending on the contents of the address part of the data element.

When the data part of the data element fed in through the first input port I1 carries data and is sent, through the switching unit 1, to the second output port O2, then the data element fed in through the second input port I2 can be sent, through the switching unit 1, to the first output port O1. If the data part of the data element fed in through the second input port is empty, this empty data part, or corresponding signal, is sent to the first output port.

But if the data part of the data element fed in through the first input port I1 carries data and is sent, through the switching unit 1, only to the first output port O1, then the data element fed in through the second input port I2 is sent, through the switching unit 1, to the second output port O2. If the data part of the data element fed in through the second input port is empty, this empty data part or corresponding signal is sent to the second output port.

If the data part of the data element fed in through the first input port carries data and is sent, through switching unit 1, to both output ports O1, O2, the feeding of data via the second input port I2 is prevented. In other words, through the second input port I2 data cannot be fed into either of the output ports.

When the data part of the data element fed in through the first input port I1 is empty, the data element fed in through the second input port I2 is sent, through the switching unit 1, depending on the respective address, either to the first O1 or second output port O2, or to both. If the data part of the data element fed in through the second input port I2 is empty, this empty data part or corresponding signal is sent to the first output port O1.

If the data element fed in through the second input port I2 is going to both output ports O1 and O2, this data element can be sent to the first output port O1 only if the data element received through the first input port I1 has an empty data part.

The hardware included in the switching element of the invention can be realized with known electronic components. The internal buses 8, 9 can also be realized in many different ways. It is also obvious that the operation of the switching element is controlled, through the control unit 2, in a programmed fashion, which may at least partly be realized by means of wiring and logic members.

The switching element of the invention can be realized as a VLSI unit or an independent circuit, whereby various switching topologies are formed.

Figure 2:
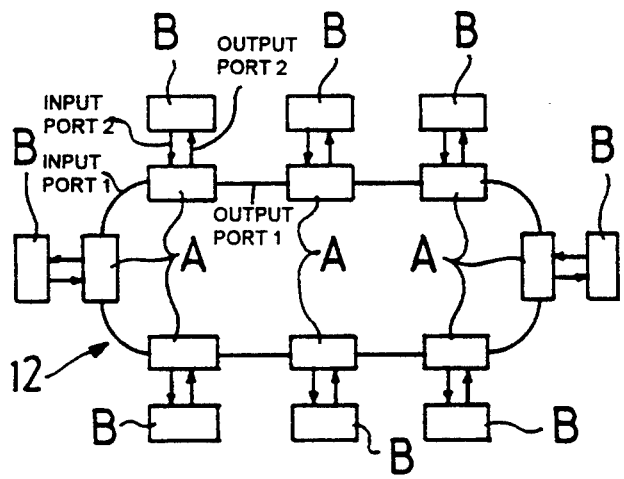
FIG. 2 illustrates a ring topology formed of the switching elements of the invention.

FIG. 2 illustrates a ring topology, where the switching elements A of the invention are connected in a ring 12. This switching ring 12 is further connected to peripheral devices B. In this case the first output port O1 of each switching element A is connected to the first input port I1 of the next switching element. Each peripheral device B is then connected to the switching element A by means of the second input port I2 and the second output port O2. Thus a number of the switching elements of the invention are together connected to form a synchronous parallel ring with N bits. Several rings can be switched in succession through the switching elements A.

Figure 3:
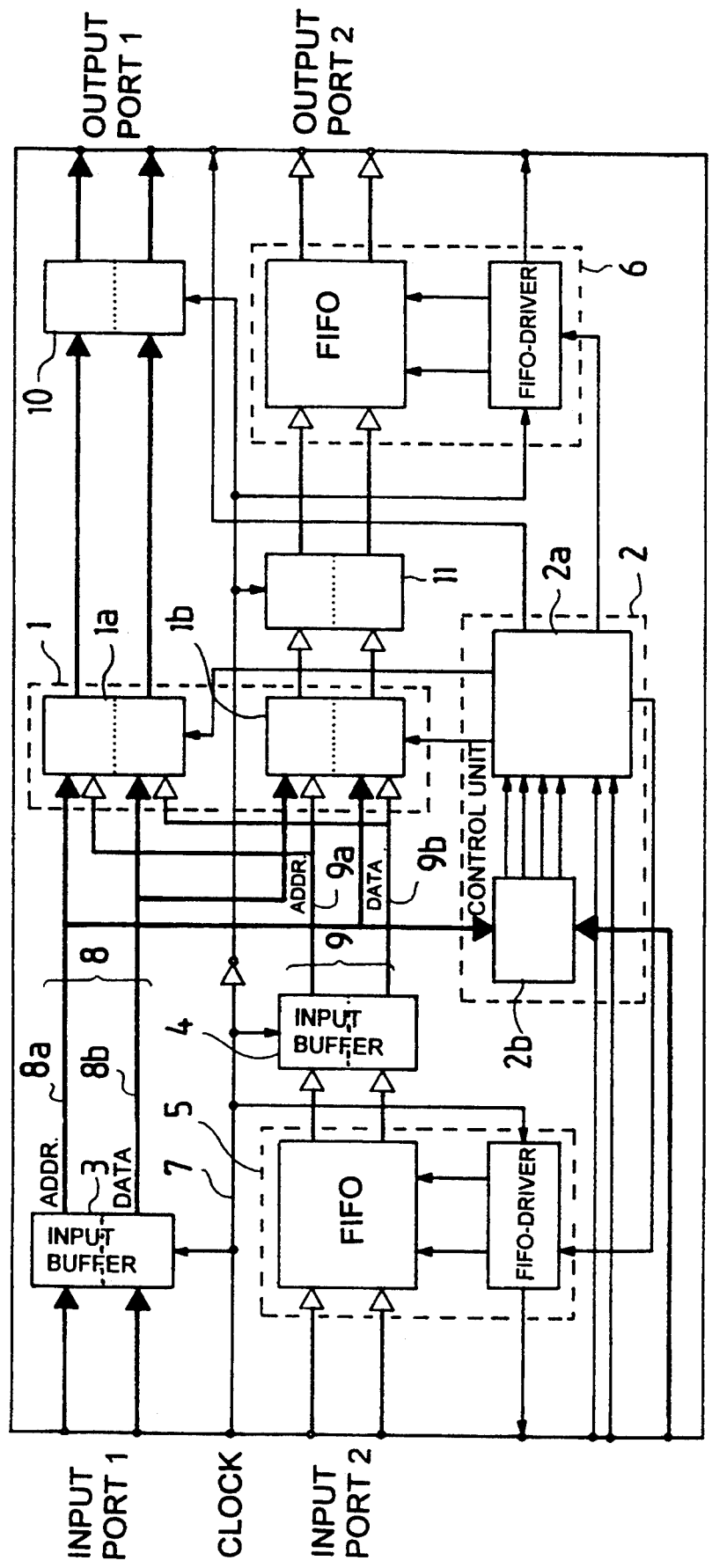
FIG. 3 illustrates a switching element of the invention, with the control signals between the most important operational sectors.

FIG. 3 illustrates a preferred embodiment of the switching element, particularly suited in ring-type topologies. This switching element is described in a block diagram completed with the most important control signals between the operational sectors of the individual units. External connecting signals are also provided in the illustration.

The switching element of FIG. 3 comprises respective connections, i.e. the input and output ports I1, I2; O1, O2, and units as in the switching element of FIG. 1, and like numbers are used for like parts. In connection with the second input and output ports I2, O2, there are provided the FIFO buffers 5, 6. In the output of the first switching unit 1a, there is arranged an output buffer 10. In between the first switching unit 1b and the second buffer 6, there is also arranged an output buffer 11.

The switching element is connected to the ring through the input ports I1: ADDR_IN_1 and DATA_IN_1, as well as through the output ports O1: ADDR_OUT_1 and DATA_OUT_1. Through the ports I2: ADDR_IN_2 and DATA_IN_2, as well as O2: ADDR OUT 2 and DATA_OUT_2, peripheral devices are connected to the switching element. The peripheral device can be, depending on the solution in question, for instance a microcomputer, a memory card, a microprocessor, an I/O device or an interface to another ring.

The clock signal CLOCK is the timing signal of the ring, and it also synchronized the operation of the switching element. By using the FIFO_FULL and FIFO_EMPTY signals, the switching element controls the data transfer into the peripheral device. With the TRANS/EMPTY and LOOP signals, the peripheral device informs the switching element to which output port the data element stored in an output buffer must be connected.

The NODE-ADDR signals are used for setting the address of the peripheral device, on the basis of which address the switching element knows which data elements coming from the ring the switching element must receive and transfer further to the peripheral device.

The feeding of the address information of the peripheral device to the switching element can also be performed through the FIFO memory. In that case, a separate control signal is needed to tell the control logic of FIFO, that the registered data is the address of the peripheral device. The address is stored in a separate address buffer inside the switching element. This solution reduces the need of external connection signals for the switching element, because external address lines are not needed.

The peripheral device connected to the switching element can request permission for transmission by using the TRANS_REQ signal. This signal is common to all peripheral devices connected to the ring, and several devices can request transmission simultaneously. Simultaneous transmission requests can be priorized by adding priority information to the address fields of empty data elements. On the bases of the priority information, the switching element asking for transmission decides whether or not the free interval is available for it. Another possibility for solving the priority problem is to use several transmission request lines. Thus for instance peripheral devices with a lower priority request transmission in a different line than those with a higher priority.

The TRANS_REQ signal is needed when the free intervals in the ring are continuously occupied, and the data sent by the peripheral device has been waiting for transmission in the output buffer for several intervals (clock cycles). When the preset time has passed, the switching element automatically makes a transmission request to the TRANS_REQ line. When those switching elements that continuously hold the free intervals detect that the transmission request line is activated, they release intervals, after a certain delay, for the disposal of other switching elements. The duration of the delay depends on the arrangement in question and may vary in length, even with the switching elements of one and the same ring. The length of the interval can be permanently programmed in the switching element, or it can be set from the peripheral device, through the FIFO memory.

When a peripheral device has obtained permission for transmission, the switching element deletes the request from the TRANS_REQ line. This procedure prevents any of the peripheral devices from obtaining all free intervals in a busy situation. On the other hand, this procedure allows a peripheral device with a large transmission capacity at best to obtain to whole capacity of the ring, at times when other peripheral devices connected to the ring do not request transmission. The allocation of transmission turns is carried out rapidly, because the control decision is made in the switching element. This arrangement enables real-time processing with very high data transfer rates in the switching elements.

For the observation and control of the ring, the switching element can be provided with a traffic-supervising logic in connection with the TRANS_REQ line. If a switching element has activated the TRANS_REQ line but has not received permission for transmission for a long time, it can, after a predetermined period, start, under the control of the supervising logic, removing from the ring such data elements that are not addressed there. This procedure prevents the ring from being blocked in a situation where one of the peripheral devices or switching elements is defective and has started sending irrational messages in all free intervals.

A defective peripheral device can be identified for instance so that the switching element (and/of peripheral device) that has detected the defect sends an enquiry to all peripheral devices connected to the ring. Those peripheral devices that do not reply to this enquiry can be considered defective. A defective peripheral device can be separated from the ring for instance by sending, via the ring, a command for the respective switching element connected to the defective device, this command setting the said peripheral device in a state where the switching element sends all data elements received from the ring directly to the output port of the ring. This is possible only when the switching element itself is not defective.

The processing of the data received by the switching element from the ring (port I1 ADDR_IN_1 and DATA_IN_1) is carried out on the basis of the address part of the data elements. The switching element examines the address part in the address decoding and coding unit 2b (ADDRESS DECODING) and decides, on the basis of the coding result, where the received data element is connected by means of the control unit 2a proper. The processing and conducting to the right output buffer of the data received from a peripheral device (port I2; ADDR_IN_2 and DATA_$_{IN}$_2) is carried out by means of the LOOP and TRANS-/EMPTY signals, which are received in the control unit 2a.

If the address information of the peripheral device and the delay information needed for the transmission request and release of intervals is sent through the FIFO memory 5, one or more additional signals are required for controlling the data coming from the peripheral device. The processing of the data elements coming from the ring and a peripheral device is priorized, so that the data element coming from the ring has a higher priority in cases where data is simultaneously going to the same output port from both input ports.

The data elements proceeding in the ring can be divided into five different types with respect to the switching element. The following is a list of the data element types and a description of the measures carried out by the switching element.

1) The received data element is addressed to the switching element

The switching element identifies in the address decoding and coding unit 2b (ADDRESS DECODING), that the received data element is addressed to a peripheral device connected to the switching element. The RECEIVE signal is activated, and under the control of the control unit 2a proper (CONTROL AND TIMING) the received data element is stored in the input buffer 6 of the peripheral device. The writing of data in the input buffer further makes the FIFO_EMPTY signal inactive, thus informing the peripheral device that the input buffer contains data ready for processing.

If a peripheral device has data ready for transmission, and the data is waiting in the output buffer 5, the outgoing data element is connected to the output port O1 of the ring at the same moment when the received data element is stored in the input buffer. If the LOOP signal is active, i.e. the data element contained in the output buffer must be switched back to the peripheral device (data looping), the data element is not transmitted.

2) The received data element is of the broadcast type

In the address decoding and coding unit 2b (ADDRESS DECODING), the switching element identifies the received data element to be of the broadcast type and activates the BROADCAST control signal. Under the control of the control unit 2a (CONTROL AND TIMING) proper, the received data element is simultaneously switched both to the input buffer 6 of the peripheral device and to the output port O1 of the ring. If the peripheral device contains data to be transmitted at the same time, the transmission of data is prevented for the duration of this interval.

3) The received data element is empty

In the address decoding and coding unit 2b (ADDRESS DECODING), the switching element identifies the received data element to be empty and activates the EMPTY signal. If the peripheral device carries data to be transmitted (the TRANS/EMPTY signal is active), it is switched to the output port O1 of the outgoing data ring. If the LOOP signal is active at the same time, the data element contained in the output buffer is simultaneously switched to the input buffer 6 of the peripheral device. If only the LOOP signal is active, the data element contained in the output buffer is switched to the input buffer of the peripheral device, and the empty data element received from the ring is switched to the output port of the ring. If the peripheral device does not contain any data to be transmitted, an empty data element is switched to the output port of the ring. In this case nothing is switched to the input buffer of the peripheral device.

4) The received data element is sent by the switching element itself

In the address decoding and coding unit 2b (ADDRESS DECODING), the switching element identifies the received data element to have been sent by itself, and activates the DELETE signal. The switching element removes the received data element from the ring and destroys it. If the peripheral device simultaneously contains data to be transmitted (the TRANS-/EMPTY signal is active, the LOOP signal inactive), the outgoing data element is switched to the output port of the ring. If the LOOP signal is active at the same time, the data element contained in the output buffer is simultaneously switched to the input buffer of the peripheral device. If only the LOOP signal is active, the data element contained in the output buffer is switched to the input buffer of the peripheral device, and an empty data element is switched to the output port of the ring. If the peripheral device does not contain data to be transmitted, an empty data element is switched to the output port of the ring. In this case nothing is switched to the input buffer of the peripheral device.

A data element is removed from the ring for instance in cases where the switching element has sent a broadcast-type data element to the ring. After this data element has circulated in the ring, the switching element that sent it must remove the data element from the ring in order to prevent the ring from being blocked. Another situation where a switching element may receive a data element sent by itself is a defect case, where the switching element addressed as the recipient of the data element is defective. If the switching element that sent the data element does not remove it from the ring, it remains to load the ring forever.

5) The address of the received data element is not identified

The address decoding and coding unit 2b (ADDRESS DECODING) of the switching element does not identify the address of the received data element. The received data element is switched directly through the input port of the ring to the output port thereof. If a peripheral device contains data to be transmitted, it is not switched during this period. If the output buffer of the peripheral device contains data, and only the LOOP signal is active, the data element is switched to the input buffer of the peripheral device. If the peripheral device does not contain data to be transmitted, the only control step carried out in the switching element is to switch the data element coming from the ring back to the ring.

Figure 4:
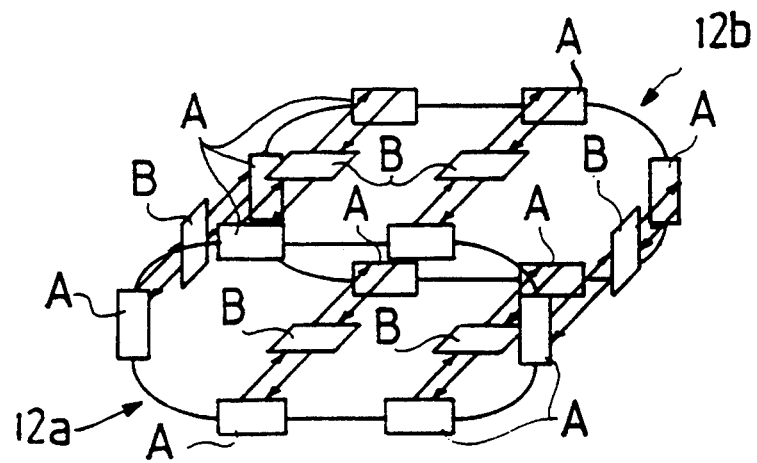
FIG. 4 illustrates a parallel ring topology formed of the switching elements of the invention.

In FIG. 4, switching elements A of the invention are interconnected in similar fashion as in FIG. 2. In this case two rings C and D, containing a number of switching elements, are parallelly coupled to each other by intermediation of peripheral devices B.

Figure 5:
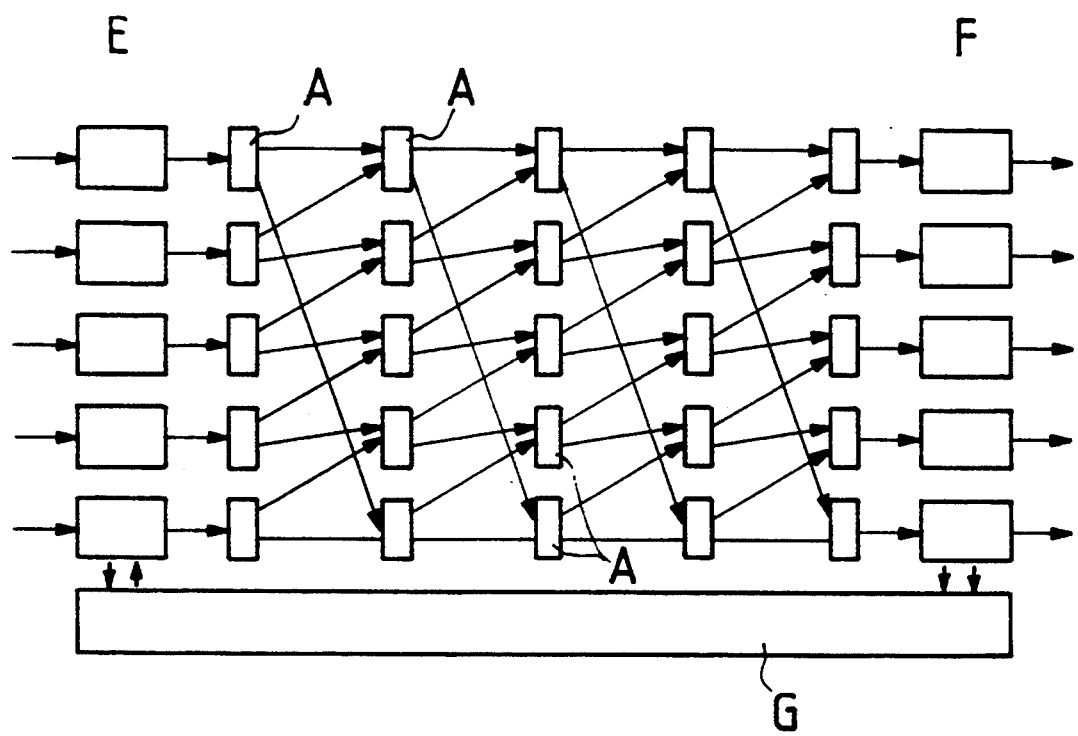
FIG. 5 illustrates a grid topology formed of the switching elements of the invention.

In FIG. 5, the switching elements A of the invention are coupled in a grid topology. In this case the number of parallel switching elements is five, and five of them are likewise coupled in series. The system is also provided with separate input and output buffers E, F, which are controlled by means of a separate control logic G.

The invention is not limited to the above described embodiments, but many modifications are possible within the scope of the inventional idea defined in the appended patent claims.

We claim:

1. A method for controlling a switching element, comprising the steps of:

a) feeding a data element between a plurality of input ports and output ports upon detecting that an address part of the data element corresponds to a predetermined address of the switching element, the input ports having at least a first and a second input ports, the output ports having at least a first and a second output ports, wherein when a data part of the data element fed in through the first input port carries data, and the data part is sent, through a switching unit, to the second output port, the data element fed in through the second input port is sent, through the switching unit, to the first output port, and if the data part of the data element fed in through the second input port is empty, either said empty data part or a corresponding signal is sent to the first output port;

b) feeding the data element between the input ports and output ports detecting that the address part of the data element corresponds to the predetermined address of the switching element, wherein when the data part of the data element fed in through the first input port carries data and is sent, through the switching unit, to the first output port only, the data element fed in through the second input port is sent, through the switching unit, to the second output port, and if the data part of the data element sent in through the second input port is empty, either the empty data part or a corresponding signal is sent to the second output port;

c) feeding the data element between the input ports and output ports detecting that the address part of the data element corresponds to the predetermined address of the switching element, wherein when the data part of the data element fed in through the first input port carries data and is sent, through the switching unit, to both first and second output ports, data feeding through the second input port is prevented;

d) feeding the data element between the input ports and output ports detecting that the address part of the data element corresponds to the predetermined address of the switching element, wherein when the data part of the data element fed in through the first input port is empty, the data element fed in through the second input port is sent, through the switching unit, depending on the predetermined address, either to the first or second output port, or to both first and second output ports, and if the data part of the data element fed in through the second input port is empty, the empty data part is sent to the first output port; and e) feeding the data element between the input ports and output ports detecting that the address part of the data element corresponds to the predetermined address of the switching element, wherein when the data element fed in through the second input port is going to bath first and second output ports, the data element is sent to the first output port of the switching element only in cases where the first input port sends a data element with an empty data part.

* * * * *

UNITED STATES PATENT AND TRADEMARK OFFICE
CERTIFICATE OF CORRECTION

PATENT NO. : 5,444,700
DATED : August 22, 1995
INVENTOR(S) : Olli Martikainen, et al.

It is certified that error appears in the above-identified patent and that said Letters Patent is hereby corrected as shown below:

In column 5, line 52 "II" should be --I1"--.

In column 7, line 33, "DATA-$_{IN}$-2" should be --DATA-IN-2--.

In column 10, line 44, "bath" should be --both--.

Signed and Sealed this

Second Day of January, 1996

*Attest:*

BRUCE LEHMAN

*Attesting Officer*     *Commissioner of Patents and Trademarks*